(12) United States Patent
Frenkiel et al.

(10) Patent No.: US 9,483,261 B2
(45) Date of Patent: Nov. 1, 2016

(54) SOFTWARE DOCUMENTATION GENERATION WITH AUTOMATED SAMPLE INCLUSION

(71) Applicant: International Business Machines Corporation, Armonk, NY (US)

(72) Inventors: Andrew Lawrence Frenkiel, Carlton (AU); Michael Priestly, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/328,133

(22) Filed: Jul. 10, 2014

(65) Prior Publication Data

US 2016/0011868 A1      Jan. 14, 2016

(51) Int. Cl.
*G06F 9/44*      (2006.01)

(52) U.S. Cl.
CPC .. *G06F 8/73* (2013.01); *G06F 8/30* (2013.01)

(58) Field of Classification Search
None
See application file for complete search history.

(56) References Cited

U.S. PATENT DOCUMENTS

| | | | |
|---|---|---|---|
| 6,592,628 B1* | 7/2003 | Prinzing | 715/209 |
| 7,039,648 B2* | 5/2006 | David | |
| 7,131,112 B1* | 10/2006 | Bartz et al. | 717/122 |
| 7,447,713 B1* | 11/2008 | Berkheimer | |
| 8,117,589 B2 | 2/2012 | Christensen et al. | |
| 8,561,036 B1* | 10/2013 | Beans et al. | 717/140 |
| 8,650,517 B1* | 2/2014 | Sundararajan et al. | 716/104 |
| 8,694,964 B1* | 4/2014 | Picard | G06F 8/73 715/200 |
| 2002/0040273 A1* | 4/2002 | John et al. | 702/5 |
| 2003/0192029 A1* | 10/2003 | Hughes | G06F 8/20 717/101 |
| 2004/0031015 A1* | 2/2004 | Ben-Romdhane et al. | .. 717/107 |
| 2004/0061719 A1 | 4/2004 | Barsness et al. | |
| 2005/0081189 A1* | 4/2005 | Krasikov | G06F 8/73 717/123 |
| 2005/0144556 A1* | 6/2005 | Petersen et al. | 715/513 |
| 2005/0289156 A1* | 12/2005 | Maryka et al. | 707/100 |
| 2006/0041837 A1* | 2/2006 | Amir et al. | 715/513 |
| 2008/0127136 A1* | 5/2008 | Hino et al. | 717/140 |
| 2008/0140537 A1* | 6/2008 | Powell | 705/26 |
| 2008/0154855 A1* | 6/2008 | Balabhadrapatruni et al. | .. 707/3 |

(Continued)

OTHER PUBLICATIONS

She, S., "CodeLink: Using Semantic Wiki for Code Documentation. CS886: Natural Language Computing Project." Aug. 10, 2007; http://www.uwaterloo.ca/-shshe/files/steven_she_cs886_project_paper_codelink.pdf.

(Continued)

*Primary Examiner* — Isaac Tecklu
(74) *Attorney, Agent, or Firm* — Fleit Gibbons Gutman Bongini Bianco PL; Jeffrey N. Giunta

(57) ABSTRACT

Automated creation of augmented documentation fragments that are augmented with usage examples. A plurality of documentation fragments is stored, where each documentation fragment documents a software element and has at least one associated property. A corresponding source code software fragment that corresponds to at least one associated property of at least one software element is identified based on an automated software analysis process of source code within a source code repository and further based on a list of properties comprising each associated property of each software element within the plurality of software elements. An augmented documentation fragment that includes a selected documentation fragment and the at least one corresponding source code software fragment corresponding to at least one associated property of the selected documentation fragment is created in response to the identifying.

19 Claims, 5 Drawing Sheets

(56) References Cited

U.S. PATENT DOCUMENTS

| | | | | |
|---|---|---|---|---|
| 2009/0265339 A1* | 10/2009 | Chen et al. | | 707/5 |
| 2009/0265372 A1* | 10/2009 | Esmann-Jensen | | 707/102 |
| 2010/0218126 A1* | 8/2010 | Edwardson | | 715/762 |
| 2010/0242028 A1* | 9/2010 | Weigert | | 717/131 |
| 2011/0161931 A1* | 6/2011 | Camelon et al. | | 717/121 |
| 2011/0167409 A1* | 7/2011 | Schadow | | 717/123 |
| 2011/0197178 A1* | 8/2011 | Johnston | | 717/123 |
| 2012/0084224 A1* | 4/2012 | Bhandar et al. | | 705/342 |
| 2012/0136925 A1* | 5/2012 | Horiuchi et al. | | 709/203 |
| 2012/0254162 A1* | 10/2012 | Asadullah et al. | | 707/723 |
| 2012/0254835 A1* | 10/2012 | Muddu et al. | | 717/121 |
| 2013/0074036 A1* | 3/2013 | Brandt | G06F 8/33 | 717/113 |
| 2013/0238988 A1* | 9/2013 | Lee et al. | | 715/264 |
| 2013/0283232 A1* | 10/2013 | Van Megchelen | G06F 17/30235 | 717/106 |
| 2014/0304682 A1* | 10/2014 | Taylor et al. | | 717/113 |
| 2014/0337820 A1* | 11/2014 | Km et al. | | 717/123 |
| 2015/0007137 A1* | 1/2015 | Phelan et al. | | 717/123 |

OTHER PUBLICATIONS

Just Systems, "The Document as Application—The Convergence of Document Publishing and Application Development," A JustSystems WhitePaper; copyright JustSystems; http://na.justsystems.com/files/Whitepaper-Doc_as_App.pdf., Mar. 1, 2008, pp. 1-7.

QT Project forums; developed by Nokia; "Automated Linking to Documentation," http://qt-project.org/forums/viewthread/12742. Downloaded on Jun. 3, 2013, pp. 1-3.

MediaWiki, "Help: Properties and Types", Portions of MediaWiki Help pages, http://semantic-mediawiki.org/wiki/Help: Properties_and_types. Jun. 30, 2014, downloaded from archive.org on Jul. 20, 2015, pp. 1-22.

* cited by examiner

200

FunctA int FunctA (int a, int b)
float FunctA (int a, int b)

Performs function A of input intergers a and b, and returns the value A(a,b).

202

Examples

210 — Quality: 10
int FunctA (int a, int b);
int i;
float f;

i = FunctA(a, b); /* returns integer value */
f = FunctA(a, b); /* returns floating point value */

204

Improper Usage

212 — Quality: 2
char FunctA (int a, int b), c;
c = FunctA(a, b); /* cast return as character value */

SOFTWARE DOCUMENTATION GENERATION WITH AUTOMATED SAMPLE INCLUSION

BACKGROUND

The present invention generally relates to generating software documentation, and more particularly relates to systems to generate documentation that describe software elements and also provide examples of their use.

Source code developers often use functionalities provided by software libraries or other objects that are accessed through function calls or method invocations such as Application Program Interfaces (APIs). Generally, software libraries of other objects that provide functions have standard software interfaces that are described and otherwise explained in documentation packages. Documentation packages describe, for example, the operation of each software interface, any preparation that may be performed prior to accessing the software interface, and the structures used to access the software interface, including s input variables or structures and output variables or structures.

Software interface documentation often includes one or more examples of source code that invokes the software interface. Source code examples are often very helpful in quickly understanding how to effectively use a software interface. However, creation of source code examples, such as at a time when new software libraries or when new API versions are released, is sometimes time consuming. Generic source code examples, such as those that may be created by a software library developer, may not exhibit the most relevant aspects of the software interface with respect to the context being addressed by a particular software developer.

A software developer is also able to study source code in an existing project in an attempt to quickly determine how to best utilize a software interface. Although the source code in an existing project available to the software developer may be more relevant to the environment in which his or her software is being developed, the software developer may not have the experience with the software interface to realize whether a particular usage in the existing source code is typical and uses good coding practices, or if the usage is idiosyncratic or even problematic.

BRIEF SUMMARY

In one example, a method of forming documentation for a software element includes storing a plurality of documentation fragments where each documentation fragment within the plurality of documentation fragments documents a software element within a plurality of software elements and each documentation fragment has at least one associated property. The method further includes identifying, based on an automated software analysis process of source code within a source code repository and further based on a list of properties comprising each associated property of each software element within the plurality of software elements, a corresponding source code software fragment that corresponds to at least one associated property of at least one software element. The method further includes creating, in response to the identifying, an augmented documentation fragment comprising a selected documentation fragment and the at least one corresponding source code software fragment corresponding to at least one associated property of the selected documentation fragment.

In another example, a documentation fragment creator includes a documentation fragments storage configured to store a plurality of documentation fragments where each documentation fragment documents a software element within a plurality of software elements and each documentation fragment has at least one associated property. The documentation fragment creator further includes an automated software analysis processor that is communicatively coupled to the documentation fragments storage and configured to identify a corresponding source code software fragment that corresponds to at least one associated property of at least one software element based on an automated software analysis process of source code within a source code repository and further based on a list of properties comprising each associated property of each software element within the plurality of software elements. The corresponding source code software fragment that corresponds to at least one associated property of at least one software element further includes a documentation fragment creation processor configured to create, in response to the identifying, an augmented documentation fragment comprising a selected documentation fragment and the at least one corresponding source code software fragment corresponding to at least one associated property of the selected documentation fragment.

In yet another example, a non-transitory computer program product for forming documentation for a software element, where the computer program product includes a computer readable storage medium having computer readable program code embodied therewith, the computer readable program code is configured to store a plurality of documentation fragments where each documentation fragment documents a software element within a plurality of software elements and has at least one associated property. The computer readable program code is further configured to identify a corresponding source code software fragment that corresponds to at least one associated property of at least one software element based on an automated software analysis process of source code within a source code repository and further based on a list of properties comprising each associated property of each software element within the plurality of software elements. The computer readable program code is further configured to create, in response to the identifying, an augmented documentation fragment comprising a selected documentation fragment and the at least one corresponding source code software fragment corresponding to at least one associated property of the selected documentation fragment.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 illustrates an augmented documentation fragment, in accordance with one example;

DETAILED DESCRIPTION

Figure 1:
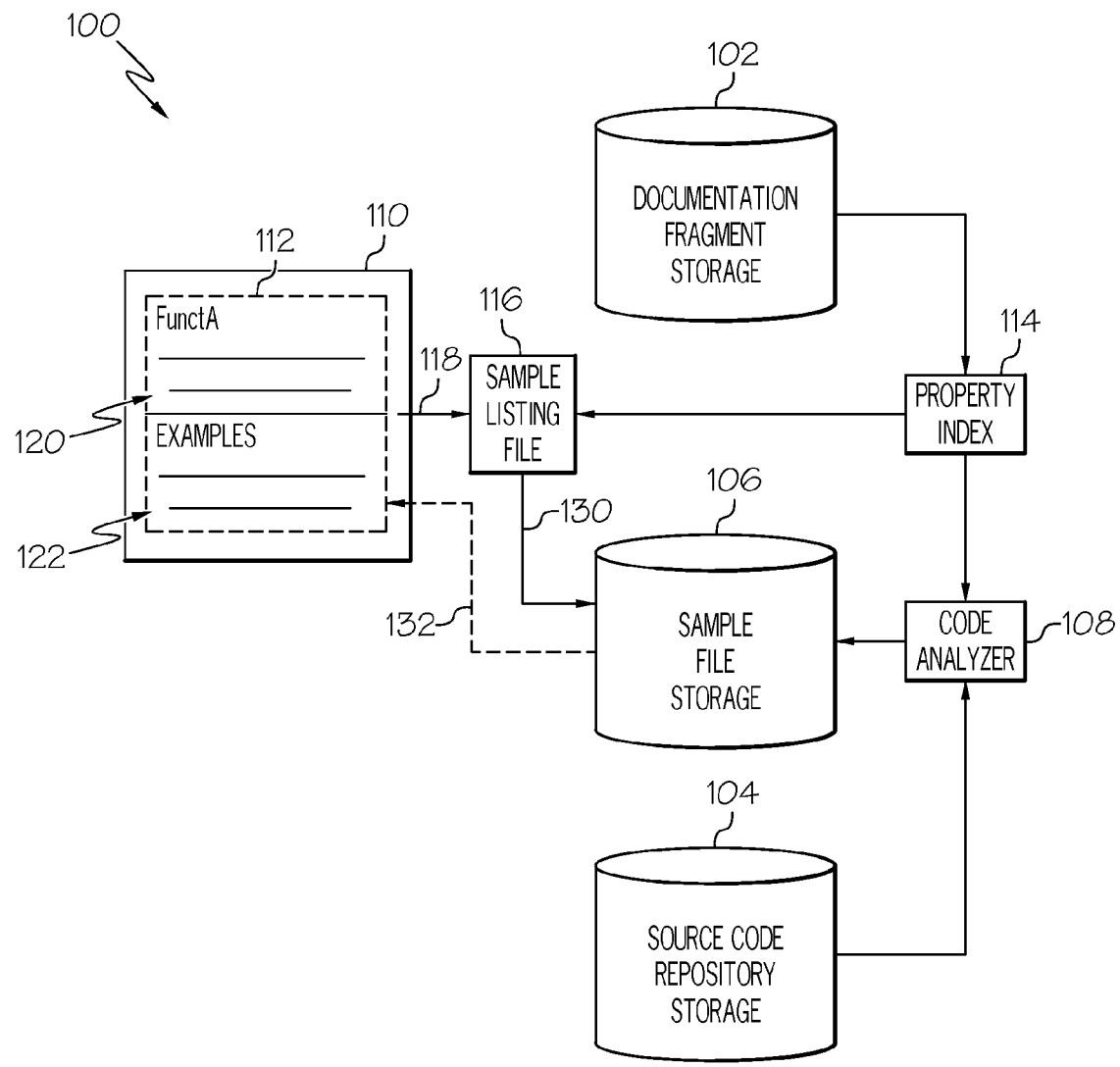
FIG. 1 illustrates a documentation generation system, in accordance with one example.

Described below are documentation generation systems and methods of creating and maintaining documentation to assist in the usage of various items, where the documentation further includes dynamically selected examples of usages of those components. The following examples describe the design and operation of documentation generation systems that create, prepare, manage, update and maintain documentation for software source code elements, such as Application Program Interfaces (APIs) that provide access to functionality performed by one or more software libraries. In an example, a documentation package is created and automatically updated for software elements within a library of software functions or other software elements, where the software functions or other elements in that library are able to be invoked, such as by function calls, by source code developed by a user of the documentation package. In the following discussion, the term "software function" is used expansively to refer to any software element that is able to be invoked by a software interface, such as by any suitable specification or identification within computer program source code. Examples of such software elements include, but are not limited to, procedures, functions, Application Program Interfaces (APIs), other software elements, or combinations of these. In one example, the documentation is assembled into a documentation package that consists of one or more documentation fragments. Each documentation fragment in one example documentation package describes a particular software element, such as a function or API, within a library of software functions.

In general, each documentation fragment has at least one associated property. Examples of an associated property of a documentation fragment include a name, topic or subject of a software element documented by the documentation fragment. In some of the examples described below, each documentation fragment is associated with a particular software function in a library of software functions. The documentation fragments in one example each identifies the software element, or software function, API, or other element being described, and describes the aspects of the software function relevant to its inclusion into other software. For example, a documentation fragment is able to describe one or more of: the function or other processing performed by the software function; any other aspects of the execution of the software function; the format in which the software function is invoked; the parameters provided to and/or returned from the software function when it is invoked; any values that may be returned by the software function; and any other relevant information associated with the particular software function.

In addition to the usually provided description of the various invocation details, results, and other aspects of software elements, a user may be helped by documentation that further provides examples of source code fragments that properly invoke a particular software function and demonstrate how to use the results that may be produced by the software function. Such information may more quickly help a user developing source code that uses or otherwise invokes that particular software function to more quickly and fully understand the nuances of the software element. The examples below describe systems and methods that create augmented documentation fragments that include not only descriptions of the software element, but also include one or more corresponding source code fragments that aid in understanding the associated property of the documentation fragment. In some instances, the corresponding source code software fragment includes example source code software fragments that illustrate proper usage of the software function. Some of the below described systems support automated selection of the corresponding source code software fragments that are included as examples into augmented documentation fragments for the various software functions.

In one example, corresponding source code software fragments that include example source code software fragments to be used to augment documentation fragments are automatically selected from one or more source code software repositories. The automatic selection process is able to be based on associated properties of each documentation fragment. In various examples, software repositories include one or more storage devices that store source code that uses the software elements for which augmented documentation fragments are to be created. For each software function being documented, example source code software fragments are selected from one or more source code repositories that illustrate proper preparation and other processing aspects associated with proper usage of the software function. For example, proper preparation of data structures or other elements, to support calling the particular software function are often illustrated in the example source code software fragment selected to be included in an augmented documentation fragment. Also illustrated may be a proper and complete function call for that software function including specification of the various parameters of the function and the data structures that may receive values produced and returned by the function.

The below described examples further allow dynamic creation at various times of augmented documentation fragments that include example source code software fragments. For example, augmented documentation fragments are able to be created periodically, or even in response to a user's request to view an augmented documentation fragment for a particular topic. In such instances, the example source code software fragments are able to be dynamically selected at a time when a version of the augmented documentation fragment is created for use by a user or software developer. In the following discussion, the documentation fragment that includes dynamically selected examples of source code software fragments is referred to as an augmented documentation fragment. In some examples, augmented documentation fragments are generated each time a user requests to view a documentation fragment for a particular software function. In those examples, the example source code software fragments included in the augmented documentation fragment are selected based on the user's request to view the documentation fragment. In further examples, augmented documentation fragments are able to be generated at any time or in response to any event, such as periodically, based upon release of updated software repositories from which software examples are drawn, or any other event.

Dynamic selection of examples of source code software fragments that are included in augmented documentation fragments allows, for example, updating or changing the example source code software fragment or fragments that are included into a particular augmented documentation fragment. For example, an augmented documentation fragment is able to be created at one time, and a different, subsequent augmented documentation fragment is able to be created at a later time. In one example, the subsequent augmented documentation fragment is able to include a subsequent set of corresponding source code software fragments, which in one example are different corresponding source code software fragments than those that were included in earlier augmented documentation fragments. For example, a subsequent augmented documentation fragment is able to include newly available or newly evaluated corresponding source code software fragments as the subsequent corresponding source code fragment. In some example, subsequent augmented documentation fragment is able to include an indication, such as a text indicator or other indication, that the included subsequent corresponding source code software fragment differs from those presented in earlier augmented documentation fragments.

Dynamic selection of examples of source code software fragments that are included in augmented documentation fragments further allows, for example, customizing or otherwise selecting different source code repositories from which corresponding source code software fragments are identified to be included into the augmented documentation fragment. Different example source code software fragments are able to be selected to be used as corresponding source code software fragments based upon, for example, the particular audience of the augmented documentation fragments. Allowing dynamic selection of example source code software fragments provides various advantages and benefits in comparison to populating documentation with statically defined corresponding source code software fragments. Such benefits include allowing updating of the examples after the software function is initially released, drawing software examples from sources beyond the original examples created by the software function development team, including software examples representing best practices of a particular company or project, and automatically drawing software examples from approved code projects.

Further, the candidate corresponding source code software fragments included in a particular augmented documentation fragment are able to be compared with other source code software fragments within one or more repositories to determine, for example, whether a candidate source code software fragment represents good coding practice or not. In one example, one or more candidate corresponding source code software fragments is able to have its quality evaluated and an indication of its quality is able to be provided in the augmented documentation fragment. In one example, an evaluation of the quality of one or more corresponding source code software fragment is able to evaluate its consistency with coding standards, consistency with identified coding practices used for a particular project, or other quality evaluation standards. A measure of compliance to, for example, defined coding standards is able to be determined for one or more candidate source code software fragments, and an indication of that measure of compliance is able to be presented in the augmented documentation fragment that includes that corresponding source code software fragment.

Additionally, trivial or redundant source code software fragments can be identified and avoided for inclusion in augmented document fragments based on, for example, heuristic criteria. Additionally, programmers who use the augmented documentation fragments are able to provide feedback and ratings of the source code software fragments that are included in the augmented documentation fragments, and such feedback is able to be incorporated into the future selection of example source code software fragments when creating augmented documentation fragments for the same software function.

In one example, the augmented documentation fragments are able to be created based on a particular project. Creating augmented documentation fragments based upon, and therefore tailored to, a particular project allows, for example, emphasizing certain software functions that are already in use by that particular software project. Further, source code software fragments are able to be drawn from the source code already developed for that project. The source code repository or repositories storing the source code developed for that project, other source code repositories that contain the example source code software fragments from which the examples are to be drawn, or both, are able to be kept private or shared only within a particular development team. Augmented documentation fragments that are made available to a limited number of users, such as to persons on a particular development team or project, can optionally incorporate samples from company-approved sources, for example code that has been identified as representing the company's best coding practices. Further, software examples are able to be drawn from public sources, such as those provided by the original software library documentation team.

Various examples of the methods and system described below include several advantages. For example, the augmented document fragments are able to be created without a full web server implementation. Creation of augmented document fragments in some examples is done locally. The documentation fragments used as a basis for augmented document fragments are able to be based on various formats, such as HTML or XML for the documentation fragments and any source code format for the software examples. Augmented documentation fragments are able to be created with multiple tiers of association, such as formal augmented documentation fragments that include software examples from public sources, augmented documentation fragments that include example source code software fragments from public company-approved sources, and augmented documentation fragments that include software examples from public team-specific sources. Further, the augmented documentation fragments are able to be updated automatically based on existing build processes for both code and documentation. In one example, documentation and code build processes drive automatic updates into the documentation without extra user intervention. Automated selection of example source code software fragments further obviates explicit user tagging to identify relevant source code to be linked into the documentation.

In one example, documentation includes initial documentation fragments that are created for each software element for which augmented documentation fragments will be available. Each initial documentation fragment in an example links to an example listing file, which in turn includes links to one or more files with example source code software fragments to be included into that augmented documentation fragment. The files with example source code software fragments are able to be provided by any suitable source, such as the documentation author, or the files with example source code software fragments can be added later, such as by software architects or end-user programmers.

The augmented documentation fragments are created by, in one example, being built into an output format, such as HTML, PDF, or ePub, that augments the initial documentation fragments by, for example, either placing the selected software examples inline within the documentation fragment for reading, or by providing a dynamic link that brings the software examples inline within the document when the document is opened or otherwise presented to a user.

An example of creating a set of augmented documentation fragments for a software library includes several steps. In one example, a property index is created and maintained for the assembly of documentation fragments. The property index includes properties associated with software elements documented by the documentation fragments. Examples of "properties, such as keywords including the software function names, the library object method names, the class names, and the like of the software elements described in the documentation fragment. This property index is a basis for scanning existing source code software fragments to identify and evaluate relevant examples to include into augmented documentation fragments. In some examples, a listing of topics/pages for each of those keywords (e.g., the main description for each software function) can be used to generate a project-specific view of the documentation.

At any time after the index is created additional software examples in existing source code are able to be identified for potential use as examples in documentation fragments. For example, an automated analysis tool is able to analyze the project source code to identify relevant occurrences in the source code of the software functions associated with each documentation fragment. Such relevant occurrences in the source code are based upon, for example, the properties listed in the index for each documentation fragment. Such an analysis tool is able to be based on, for example, a simple search engine or a more sophisticated code analysis tool. Analysis of source code to identify additional software examples is able to be part of a normal code build process. Software examples that are redundant or trivial are able to be excluded, such as are identified by standard search weighting techniques or more sophisticated code analysis.

Once example source code software fragments are identified, content representing the relevant occurrences of those example source code software fragments are copied into a set of sample files, with each copied occurrence being tagged with the keywords relevant to that example. Links to the sample files are added for each keyword to the sample listing files. In some examples, the augmented documentation fragments are created in a static document format, such as a PDF file or ePub format. In the case of a static document format, the documentation is rebuilt by creation of new augmented documentation fragments, as described above. In the case of dynamically assembled document fragments, such as augmented documentation fragments that are created in the form of HTML documents with inclusion references, the new example source code software fragments are automatically included into the augmented documentation fragment when that document is viewed. In one example, analysis of source code produces a list of documentation fragment properties that actually occur in the analyzed source code. For example, a list is produced that contains the API names that are described in documentation fragments and that are also actually found in identified source code software fragments.

Once the documentation fragments are created and the sample listing files are created with links to sample file entries drawn from a particular project, a project specific view of documentation fragments can be created. In one example, a subset map of documentation fragment properties is created based on a list of properties of each created documentation fragment and based on the list of documentation fragment properties that actually occur in the analyzed source code. This subset of documentation fragment properties is able to be used to create a subset "map" of the relevant documentation pages for the particular project. This map can be used as input to a build process to produce a new customized static output (such as a custom PDF or ePub document), or used as a convenient shortcut page for accessing the relevant web pages in web-based documentation.

In one example, the example source code software fragments to be included within augmented documentation fragments are able to be optimized by using, for example, user rankings and comments on the source code software fragments presented to the user in an augmented documentation fragment. In an example, a web-based implementation could include facilities for receiving user rankings and comments regarding the example source code software fragments presented in association with the documentation fragment. The user rankings and comments are able to be used to prioritize which example source code software fragments are used within augmented documentation fragments. The user rankings and comments that are determined to be negative are also able to be used to create suggestions of usages or practices that should not be used in association with the subject of the augmented documentation fragment. For example, users identifying a source code example as poorly or improperly implementing a particular API call would be labeled as an improper implementation of that API call and warn users of how not to properly or efficiently use that particular API call.

FIG. 1 illustrates a documentation generation system 100, in accordance with one example. The documentation generation system 100 depicts a documentation display 110 with a presentation of an augmented documentation fragment 112. In one example, the documentation generation system 100 is used to generate documentation for Application Program Interfaces (APIs) in one or more software libraries in order to aid a software developer in developing source code to properly use those APIs.

The augmented documentation fragment 112 is a human readable document that includes text, and in some examples graphics, other depictions, or combinations of these. In the illustrated example, the augmented documentation fragment 112 includes a display of a documentation fragment 120 that describes one or more software elements associated with the augmented documentation fragment 112. The augmented documentation fragment 112 further includes at least one corresponding example source code software fragment 122. The corresponding example source code software fragment 122 in one example includes a portion of source code that demonstrates proper usage of the one or more source elements, such as an API function call, that is described in the documentation fragment 120. In general, a user of the documentation generation system is able to select one or more properties of elements described in an augmented documentation fragment. A documentation display 110 displays an augmented documentation fragment that includes a selected documentation fragment with associated properties corresponding to the user's selected properties and that also includes at least one corresponding source code software fragment. As described above, a property is a characteristic or other concept that is described in the documentation fragment, such as one or more keywords, software function names, library object method names, class names, and the like. An example of an augmented documentation fragment 112 is described in further detail below.

The illustrated documentation generation system 100 includes a documentation fragment storage 102. The documentation fragment storage 102 stores documentation fragments that have been created to document, e.g. describe, depict, or provide any type of information pertaining to, one or more properties. In an example, each documentation fragment stored in the documentation fragment storage 102 documents a separate API function or other interface structure of a particular software library. The properties associated with each documentation fragment stored in the documentation fragment storage 102 are stored in a property index 114. The property index 114 is able to be populated with the properties of the documentation fragments in any suitable manner. For example, automated processing of contents of the documentation fragment storage 102 is able to determine these properties and insert them into the property index 114. Alternatively, the property index is able to be created in conjunction with the creation of the documentation fragments themselves, such as by manual or automated processes incorporated into the documentation fragment creation process.

The illustrated documentation generation system 100 further includes a source code repository storage 104. The source code repository storage 104 stores source code from which examples of source code software fragments used to augment documentation fragments are identified. In various examples, the source code repository storage 104 is able to store various types of source code, such as source code associated with a particular project, source code from a number of projects, source code from a general source code repository, source code from any number of origins, or source code from any combination of these. Further, the source code repository storage 104 is able to consist of a number of storage elements storing one or more of these types of source code.

The documentation generation system 100 includes a code analyzer 108 that operates to analyze source code stored in the source code repository storage 104 to identify example source code software fragments to use to augment documentation fragments stored in the documentation fragment storage 102 and presented on the documentation display 110. In one example, the code analyzer 108 analyzes the source code within the source code repository storage 104 and, based on the properties contained in the property index 114, identifies source code software fragments that correspond to each property in the property index 114. In one example, the code analyzer 108 is an automated software analysis process.

The illustrated documentation generation system 100 also includes a sample file storage 106. The code analyzer 108 copies identified source code software fragments from the source code repository 104 into sample files stored within the sample file storage 106. In one example, each example source code software fragment is stored in a separate sample file within the sample file storage. In one example, the code analyzer 108 identifies source code software fragments that correspond to each property in the property index 114, and thus each property associated with a documentation fragment stored in the documentation fragment storage 102. In one example, the stored source code software fragments are stored in association with the properties to which they correspond in order to facilitate augmenting a particular documentation fragment with a source code software fragment that corresponds to the property or properties associated with that documentation fragment.

In one example, the each documentation fragment stored in the documentation fragment storage 102 has one or more sample listing file links 118 to entries in a sample listing file 116. The sample listing file 116 in this example has maintains one or more sample file links 130 to sample files within the sample files storage 106. Each of the sample file links 130 is associated with a property in the property index 114. In other words, the sample listing file includes a link for each property in the property index, where that link points to a sample file containing a source code software example associated with that property. With regards to the above discussed API documentation example, the sample listing file has one or more sample file links 130 for each API function or structure documented by the documentation fragments within the documentation fragment storage 102. The sample file links in the sample listing file link to a sample file that contains an example of the use of an API function or structure associated with that link. In one example, the sample listing file link 118 within a particular documentation fragment points to one or more sample file links 130 to indicate a sample file containing an example to augment that particular documentation fragment. The sample file contents 132 indicated by these links is then incorporated into the augmented documentation fragment 112.

FIG. 2 illustrates an augmented documentation fragment 200, in accordance with one example. The augmented documentation fragment 200 is an example of the augmented documentation fragment 112 depicted above with regards to FIG. 1. The illustrated augmented documentation fragment 200 includes a documentation fragment 202 that describes in this example a particular API function call "FunctA" that implements "function A," which takes two arguments.

The illustrated augmented documentation fragment 200 also includes a source code software fragment 204 that illustrates an example of the use of the API function call described in the documentation fragment 202 of this augmented documentation fragment 200. A first quality indicator 210 is displayed in association with the source code software fragment 204. The first quality indicator 210 is a respective indication of a respective quality evaluation of the source code software fragment 204. The first quality indicator is determined, for example, by an automated quality evaluation process. In this illustrated example, the first quality indicator is "10."

The value displayed for the first quality indicator 210 is able to be determined by various techniques. For example, an automated source code analysis tool or process is able to include an automated quality evaluation process to evaluate and determine the quality of each candidate source code software fragment based on various quality criteria. For example, an automated source code analysis process is able to include an automated quality evaluation process that determines compliance of the source code software fragment 204 with defined coding standards. The definition of such coding standards is able to be based on many factors, such as enterprise coding standards, coding standards defined for a particular project, or any other source. The first quality indicator 210 is also able to indicate consistency of the source code software fragment 204 with other software stored in one or more source code repositories. For example, coding practices for a particular project is able to be determined by automated analysis of source code developed for that project, and the consistency of the source code software fragment 204 is able to be compared to that determined consistent coding practice to determine a value of the first quality indicator 210. Further consistent coding practices are able to be determined based upon coding standards defined, for example to be used by a particular project where the consistent coding practices are derived by combining or modifying a number of defined coding standards. In some examples, the first quality indicator 210 is able to be obtained based on user feedback provided by users of the augmented documentation fragments. In some examples, the value of the first quality indicator 210 is able to be derived based on combining two or more of the above indicators to present a composite quality indicator as the first quality indicator 210. In alternative examples, multiple quality indicators are able to be provided for a particular source code software fragment 204, such as a separate indicator to reflect, for example, compliance with defined coding standards, consistent coding practices, and user quality feedback.

Further illustrated in the augmented documentation fragment 200 is an improper usage example 206 that demonstrates usage of the documented function in an improper manner. As discussed above, the improper usage example 206 is able to be identified by, for example, user feedback when viewing examples presented in earlier versions of augmented documentation fragments, automated analysis of the contents of the software repository according to defined software development standards, or by any other technique. A second quality indicator 212 is shown as displayed in association with the improper usage example 206. The second quality indicator 212 in this example has a value of "2" indicating the low quality of this example and thus it's selection as an "improper example." The second quality indicator 212 is able to be based on the above described criteria for the first quality indicator 210.

With reference to the documentation generation system 100 described above, the documentation fragment 202 is stored in the documentation fragment storage 102 and is selected based upon, for example, a user's selection of a documentation subject. The source code software fragment 204 is a software fragment that corresponds to the displayed documentation fragment 202. The source code software fragment 204 is identified from among software stored in the code base storage 104 in some examples by an automated software analysis process based on a property index 114 comprising the properties of the documentation fragments stored in the documentation fragment storage 102.

Figure 3:
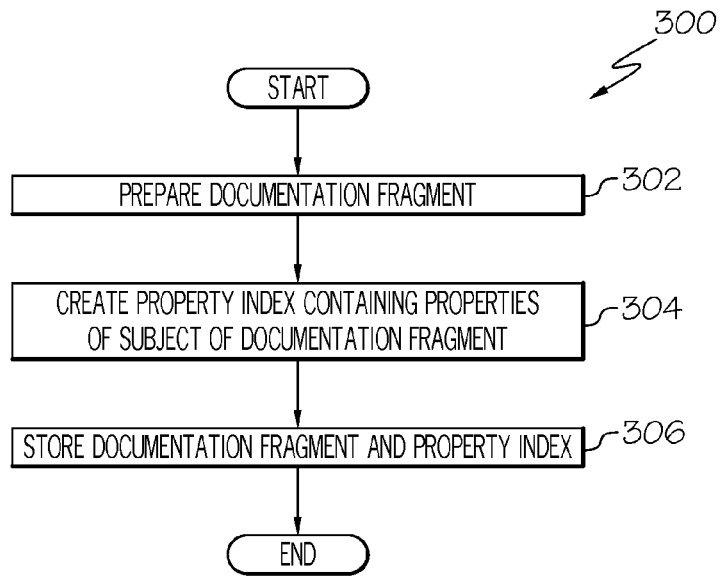
FIG. 3 illustrates a documentation fragment property index generation process, in accordance with one example.

FIG. 3 illustrates a documentation fragment property index generation process 300, in accordance with one example. The documentation fragment property index generation process 300 is performed in one example upon completion of a set of documentation fragments in order to support identification of suitable example source code software fragments used to augment each documentation fragment. The documentation fragment property index generation process 300 begins by preparing, at 302, documentation fragments. In one example, documentation fragments are created as part of a software development process whereby developers document the proper usage of a software element, such as an API function call.

The documentation fragment property index generation process 300 proceeds to create, at 304, a property index containing properties of documentation fragment. The proper index is able to be creates trough, for example, a manual or automated process. The Documentation Fragment and property index is then stored, at 306. The documentation fragment property index generation process 300 then completes.

Figure 4:
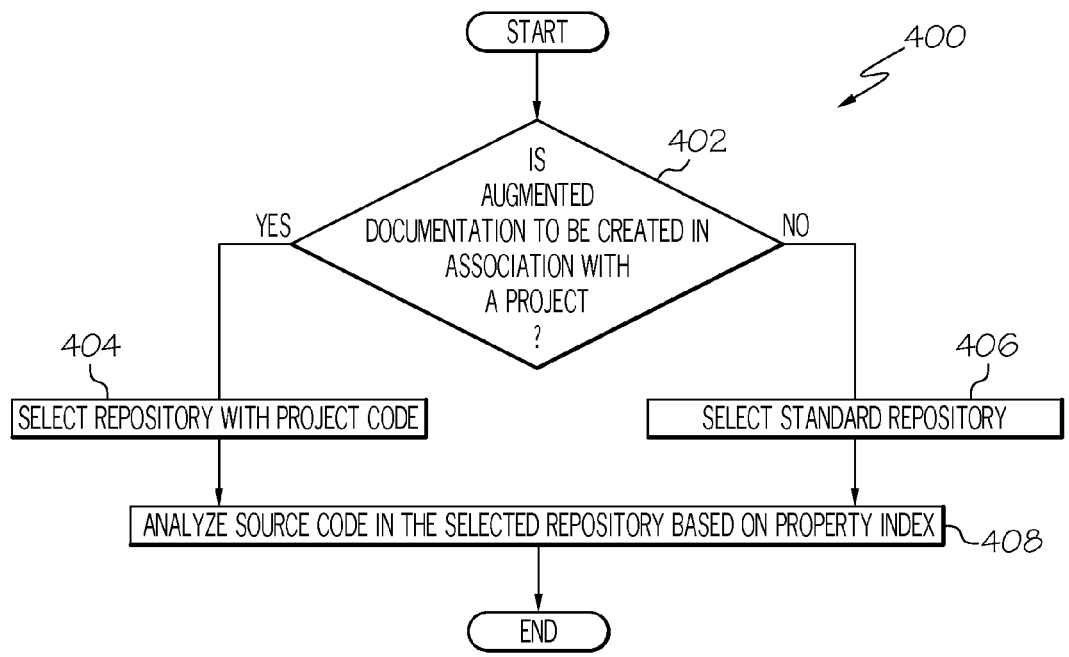
FIG. 4 illustrates a source code analysis process, in accordance with one example.

FIG. 4 illustrates a source code analysis process 400, in accordance with one example. The source code analysis process 400 is able to be performed to identify source code software fragments to be used to augment documentation fragments. The source code analysis process 400 begins by determining, at 402, if augmented documentation to be created in association with a particular software development project. In various examples, augmented documentation that is created in association with a particular development project include documentation fragments that are augmented with source code software fragments selected from software developed for that project, or from a software repository that is otherwise associated with that project.

If it is determined that the augmented documentation is to be created in association with a particular software development project, the source code analysis process 400 selects, at 404, a source code repository that is associated with the particular project. Otherwise, the source code analysis process 400 selects, at 406, a standard source code repository. The source code analysis process 400 continues by analyzing, at 408, source code in the selected repository based on property index. The source code analysis process then ends.

Figure 5:
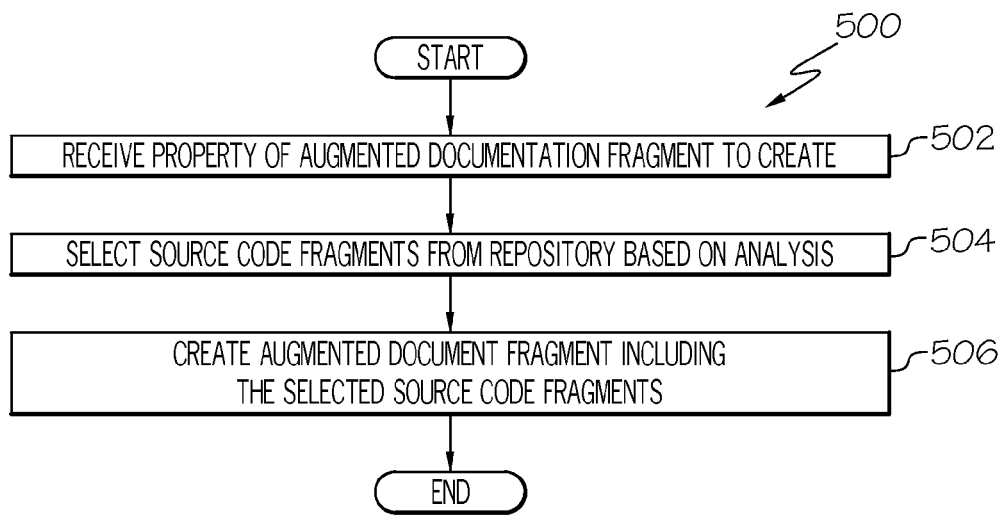
FIG. 5 illustrates an augmented documentation fragment creation process, in accordance with one example.

FIG. 5 illustrates an augmented documentation fragment creation process 500, in accordance with one example. The augmented documentation fragment creation process 500 is able to be performed based on a user's request to see documentation for the property described by a particular documentation fragment. Further the augmented documentation fragment creation process 500 is able to be performed when creating a documentation package that includes multiple documentation fragments.

The illustrated augmented documentation fragment creation process 500 begins by receiving, at 502, a property of an augmented documentation fragment to create. In one example, a user is able to enter or otherwise provide a property of a software element for which the user wishes to see augmented documentation fragments. In one example, the property is able to specify an API function or method name of a software interface for which the user wishes to obtain augmented documentation. In further examples, such as when created an complete documentation package, all properties for which documentation fragments exist are able to be received and a correspondingly complete package of augmented documentation fragments is then able to be created. All properties are able to be received through, for example, the property index 114 described above with regards to FIG. 1.

The augmented documentation fragment creation process 500 continues in this example by selecting, at 504, source code fragments from a source code repository that have associated properties of the software element that correspond to the property that had been received. In one example, the associated property of the software element is determined based on analysis, such as is described above with regards to the source code analysis process 400, of a source code within at least one source code repository by an automated software analysis process. The augmented documentation fragment creation process 500 continues by creating, at 506, an augmented document fragment including documentation fragment with associated properties corresponding to the received property and the source code software fragments that were selected based on the received property. The augmented documentation fragment creation process 500 then ends.

Figure 6:
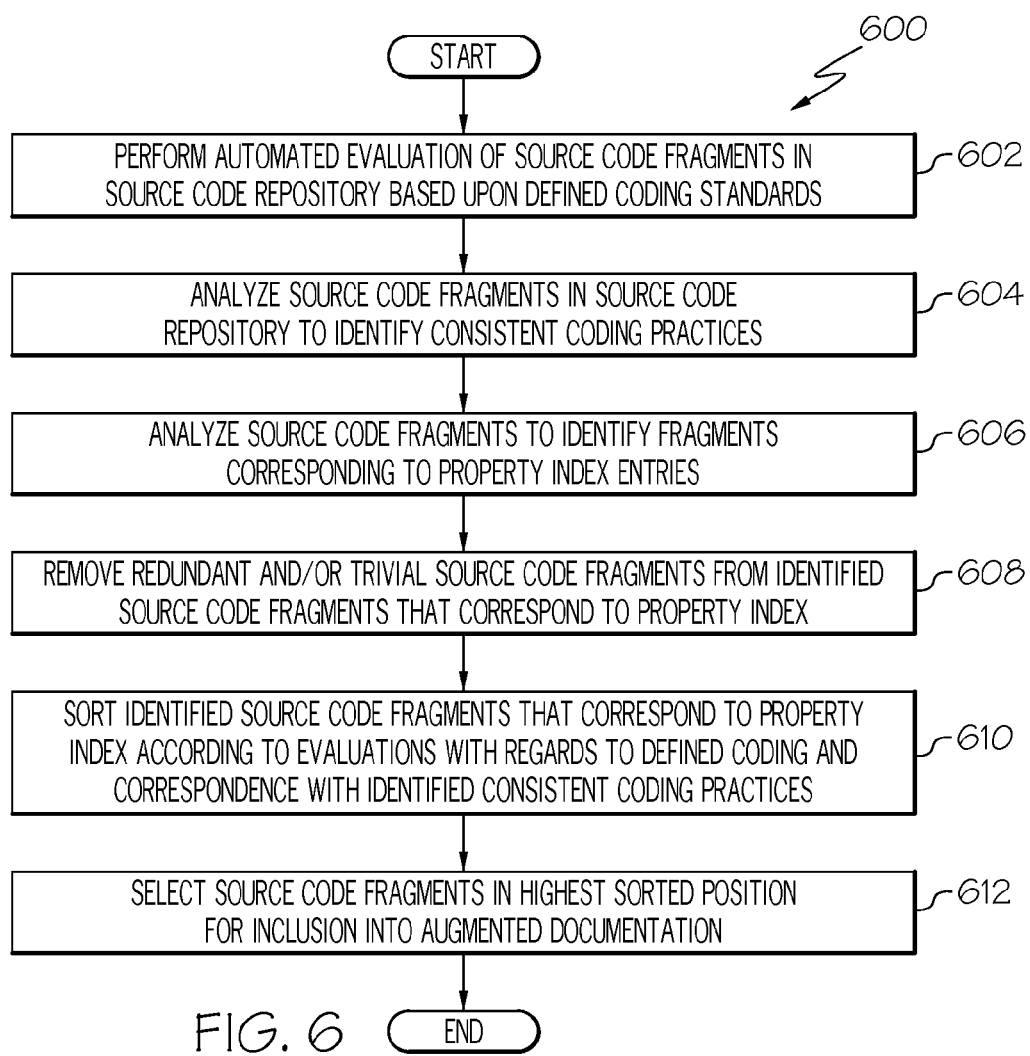
FIG. 6 illustrates a source code software fragment refinement process, in accordance with one example.

FIG. 6 illustrates a source code software fragment refinement process 600, in accordance with one example. The source code software fragment refinement process 600 is performed in various examples to identify which source code software fragments to select as examples to incorporate into augmented documentation fragments. The source code software fragment refinement process 600 is also able to support the evaluation of quality indicators to be provided with each example source code software fragment, as is described above.

The source code software fragment refinement process 600 begins by performing, at 602, automated evaluation of source code fragments in source code repository based upon defined coding standards. In one example, source code is analyzed and evaluated by an automated software analysis process. The evaluated source code fragments are then analyzed, at 604, to identify consistent coding practices. In one example, consistent coding practices are identified based on coding practice similarities that are identified as recurring in many source code software fragments in the source code repository being analyzed. Source code fragments are also analyzed, at 606, to identify source code fragments that correspond to property index entries. Redundant and/or trivial source code fragments are removed, at 608, from identified source code fragments that correspond to property index. Identified source code fragments that correspond to property index are sorted, at 610, according to evaluations with regards to defined coding and correspondence with identified consistent coding practices. Source code fragments in the highest sorted position are then selected, at 612, for inclusion into augmented documentation. The source code software fragment refinement process 600 then ends.

Information Processing System

Figure 7:
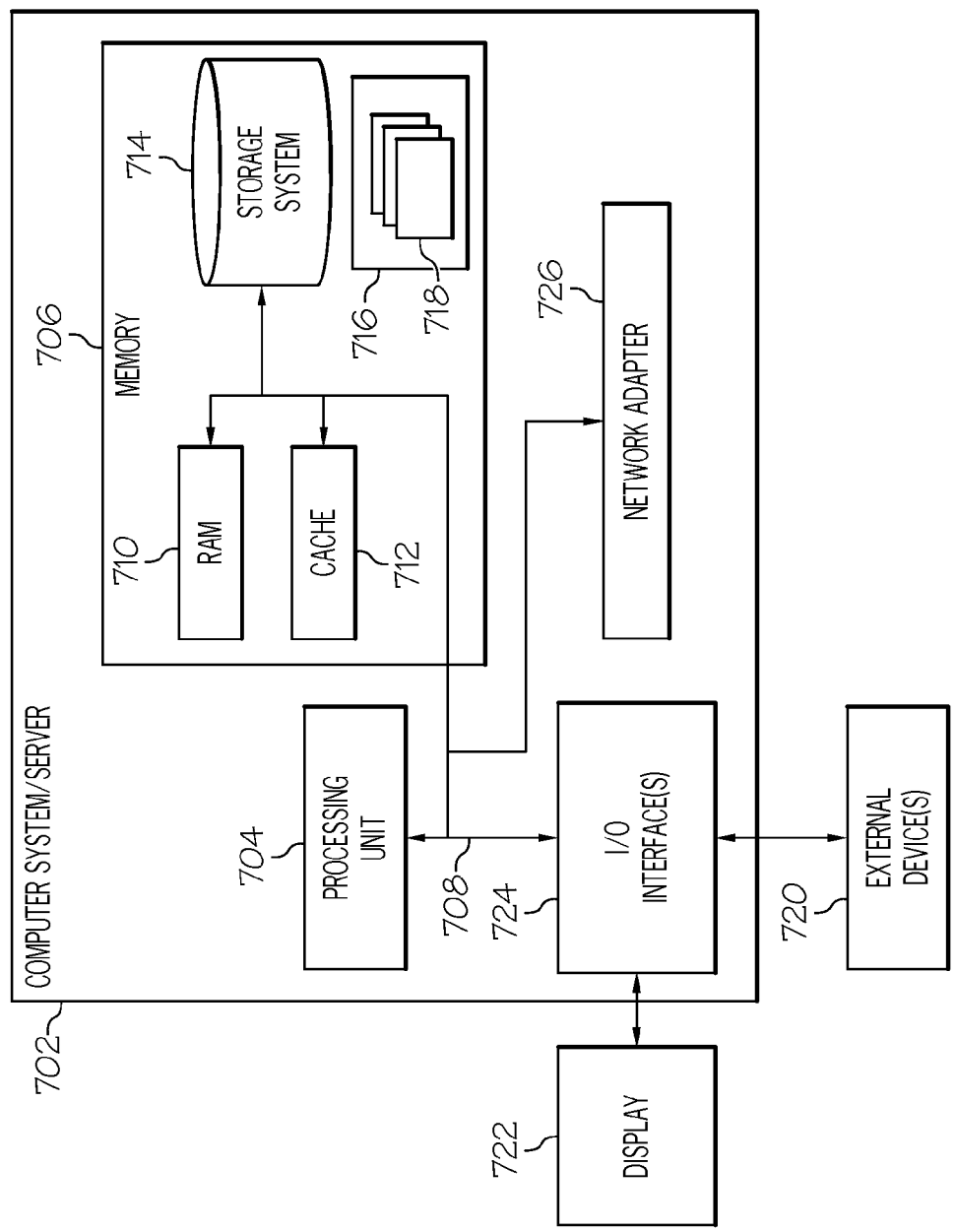
FIG. 7 is a block diagram illustrating one example of an information processing system according to one embodiment of the present invention.

Referring now to FIG. 7, this figure is a block diagram illustrating an information processing system that can be utilized in various embodiments of the present invention. The information processing system 702 is based upon a suitably configured processing system configured to implement one or more embodiments of the present invention. Any suitably configured processing system can be used as the information processing system 702 in embodiments of the present invention. The components of the information processing system 702 can include, but are not limited to, one or more processors or processing units 704, a system memory 706, and a bus 708 that couples various system components including the system memory 706 to the processor 704.

The bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 7, the main memory 706 includes the NMS 126 and its components shown in FIG. 1. Each of these components can reside within the processor 704, or be a separate hardware component. The system memory 706 can also include computer system readable media in the form of volatile memory, such as random access memory (RAM) 710 and/or cache memory 712. The information processing system 702 can further include other removable/non-removable, volatile/non-volatile computer system storage media. By way of example only, a storage system 714 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 708 by one or more data media interfaces. The memory 706 can include at least one program product having a set of program modules that are configured to carry out the functions of an embodiment of the present invention.

Program/utility 716, having a set of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of embodiments of the present invention.

The information processing system 702 can also communicate with one or more external devices 720 such as a keyboard, a pointing device, a display 722, etc.; one or more devices that enable a user to interact with the information processing system 702; and/or any devices (e.g., network card, modem, etc.) that enable computer system/server 702 to communicate with one or more other computing devices. Such communication can occur via I/O interfaces 724. Still yet, the information processing system 702 can communicate with one or more networks such as a local area network (LAN), a general wide area network (WAN), and/or a public network (e.g., the Internet) via network adapter 726. As depicted, the network adapter 726 communicates with the other components of information processing system 702 via the bus 708. Other hardware and/or software components can also be used in conjunction with the information processing system 702. Examples include, but are not limited to: microcode, device drivers, redundant processing units, external disk drive arrays, RAID systems, tape drives, and data archival storage systems.

Non-Limiting Examples

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of forming documentation for a software element, the method comprising:
storing a plurality of documentation fragments, each documentation fragment within the plurality of documentation fragments documenting a respective software element within a plurality of software elements, each documentation fragment having at least one associated property associated with its respective software element;
analyzing, with an automated software analysis process based on preparing a selected documentation fragment from within the plurality of document fragments, the selected documentation fragment documenting a selected software element, source code within a source code repository to identify source code software fragments from within the source code repository, the at least one example source code fragment depicting, within the at least one example source code software fragment, a usage of the selected software element;

identifying, based on the analyzing, at least one example source code software fragment from within the source code software fragments based on a determination the at least one example source code software fragment corresponds to the at least one associated property of the selected documentation fragment; and adding, based on the identifying, the at least one example source code software fragment to the selected documentation fragment to create an augmented documentation fragment that defines a presentation of the selected documentation fragment together with the at least one example source code software fragment.

2. The method of claim 1, wherein the source code repository comprises source code associated with a software development project, and the method further comprising:

determining that the adding the at least one example source code software fragment to the selected documentation fragment to create the an augmented documentation fragment is in association with the software development project, and wherein the identifying comprises analyzing, in response to determining that the adding is in association with the software development project, source code within the source code repository that is associated with the software development project.

3. The method of claim 1, further comprising:

identifying, subsequent to creating the augmented documentation fragment, a subsequent set of example source code software fragments; and creating, subsequent to creating the augmented documentation fragment, a subsequent augmented documentation fragment for the selected documentation fragment by adding the subsequent set of example source code software fragments to the selected document fragment.

4. The method of claim 3, wherein the subsequent set of example source code software fragments differs from the at least one example source code software fragment, and wherein the method further comprises including, within the subsequent augmented documentation fragment, an indication that the subsequent set of example source code software fragments differs from the at least one example source code software fragment.

5. The method of claim 1, wherein the automated software analysis process comprises identifying at least one redundant source code software fragment within the at least one example source code software fragment, and wherein the identifying excludes the at least one redundant source code software fragment from the at least one example source code software fragments.

6. The method of claim 1, wherein the automated software analysis process comprises determining a respective quality evaluation for each example source code software fragment, and wherein the identifying the at least one example source code software fragment is based at least partly on the respective quality evaluation.

7. The method of claim 6, further comprising:

including in the augmented documentation fragment, in association with each respective example source code software fragment, a respective indication reflecting the respective evaluation of the each respective example source code software fragment.

8. The method of claim 6, wherein determining the respective quality evaluation comprises determining, through an automated quality evaluation process, a measure of compliance of the respective example source code software fragment with defined coding standards.

9. The method of claim 6, wherein determining the respective quality evaluation comprises:

identifying, based on automated analysis of software contained within the source code repository, consistent coding practices existing in the software within the within the source code repository; and determining, subsequent to the identifying consistent coding practices, the respective quality evaluation for each respective example source code software fragment based upon correspondence between the respective example source code software fragment and the consistent coding practices.

10. The method of claim 9, wherein determining the respective quality evaluation further comprises determining the consistent coding practices, wherein the determining the consistent coding practices comprises comparing a plurality of software fragments within the source code repository to identify coding practice similarities among software fragments within the source code repository.

11. A documentation fragment creator, comprising:

a documentation fragments storage configured to store a plurality of documentation fragments, each documentation fragment within the plurality of documentation fragments documenting a respective software element within a plurality of software elements, each documentation fragment having at least one associated property associated with its respective software element;

an automated software analysis processor, communicatively coupled to the documentation fragments storage and configured to:

analyze, with an automated software analysis process based on preparing a selected documentation fragment from within the plurality of document fragments, the selected documentation fragment documenting a selected software element, source code within a source code repository to identify source code software fragments from within the source code repository, the at least one example source code fragment depicting, within the at least one example source code software fragment, a usage of the selected software element; and identify, based on an analysis of the source code within the source code repository, at least one example source code software fragment from within the source code software fragments based on a determination the at least one example source code software fragment corresponds to the at least one associated property of the selected documentation fragment; and a documentation fragment creation processor configured to add, based on the automated software analysis processor identifying, the at least one example source code software fragment to the selected documentation fragment to create an augmented documentation fragment that defines a presentation of the selected documentation fragment together with the at least one example source code software fragment.

12. The documentation fragment creator of claim 11, wherein the source code repository comprises source code associated with a software development project, and wherein the documentation fragment creation processor is further configured to determine that the addition to create the augmented documentation fragment is in association with the software development project, and wherein the automated software analysis processor is further configured to identify by analyzing, in response to a determination that the addition is associated with the software development project, source code within the source code repository that is associated with the software development project.

13. The documentation fragment creator of claim 11, wherein:
the automated software analysis processor is further configured to identify, subsequent to creation of the augmented documentation fragment, a subsequent set of example source code software fragments, wherein the subsequent set of example source code software fragments differs from a example source code software fragment; and
wherein the documentation fragment creation processor is further configured to:
create, subsequent to the creation of the augmented documentation fragment, a subsequent augmented documentation fragment for the selected documentation fragment by adding the subsequent set of example source code software fragments to the selected document fragment; and
include, in the subsequent augmented documentation fragment, an indication that the subsequent set of example source code software fragments differs from the example source code software fragment.

14. The documentation fragment creator of claim 11, wherein the automated software analysis processor is further configured to:
determine a respective quality evaluation for each example source code software fragment; and
identify the example source code software fragment further based at least partly on the respective quality evaluation.

15. The documentation fragment creator of claim 14, wherein the documentation fragment creation processor is further configured to include in the augmented documentation fragment, in association with each respective example source code software fragment, a respective indication reflecting the respective evaluation of the each respective example source code software fragment.

16. The documentation fragment creator of claim 14, wherein the automated software analysis processor is further configured to determine the respective quality evaluation by at least in part determining, through an automated quality evaluation process, a measure of compliance of the respective example source code software fragment with defined coding standards.

17. The documentation fragment creator of claim 14, wherein the automated software analysis processor is further configured to determine the respective quality evaluation by at least in part:
identifying, based on automated analysis of software contained within the source code repository, consistent coding practices existing in the software within the within the source code repository; and
determining, subsequent to the identifying consistent coding practices, the respective quality evaluation for each respective example source code software fragment based upon correspondence between the respective example source code software fragment and the consistent coding practices.

18. The documentation fragment creator of claim 17, wherein the automated software analysis processor is further configured to determine the respective quality evaluation by at least in part determining the consistent coding practices, wherein the determining the consistent coding practices comprises comparing a plurality of software fragments within the source code repository to identify coding practice similarities among software fragments within the source code repository.

19. A non-transitory computer program product for forming documentation for a software element, the computer program product comprising a computer readable storage medium having computer readable program code embodied therewith, the computer readable program code configured to:
store a plurality of documentation fragments, each documentation fragment within the plurality of documentation fragments documenting a respective software element within a plurality of software elements, each documentation fragment having at least one associated property associated with its respective software element;
analyze, with an automated software analysis process based on preparing a selected documentation fragment from within the plurality of document fragments, the selected documentation fragment documenting a selected software element, source code within a source code repository to identify example source code software from within the source code repository, the at least one example source code fragment depicting, within the at least one example source code software fragment, a usage of the selected software element; and
identify, based on an analysis of the source code within the source code repository, at least one example source code software fragment from within the source code software fragments being selected based on a determination the at least one example source code software fragment corresponds to the at least one associated property of the selected documentation fragment; and
add, based on the identification of the example source code software fragment, the at least one example source code software fragment to the selected documentation fragment to create an augmented documentation fragment that defines a presentation of the selected documentation fragment together with the at least one example source code software fragment.

* * * * *